United States Patent
Jedvall, deceased et al.

[15] 3,706,927
[45] Dec. 19, 1972

[54] METHOD FOR MEASURING THE ABSOLUTE DISTANCE TO A LEAKAGE FAULT IN AN ELECTRICAL CONDUCTOR

[72] Inventors: Gustaf I. Jedvall, deceased, late of Stockholm, Sweden; by Arne Mogensen, administrator, Crusebjoerns Veg 27, S-140 30 Uttran, Sweden

[22] Filed: April 27, 1971

[21] Appl. No.: 137,911

[52] U.S. Cl. ................................................ 324/52
[51] Int. Cl. ............................................ G01r 31/08
[58] Field of Search .......................................... 324/52

[56] References Cited

UNITED STATES PATENTS 1,034,609   8/1912   Friendly ................................ 324/52

OTHER PUBLICATIONS

Laying Cable in the Forward Area Wire Communication Training Pamphlet No. 4, Signal Corps U.S. Army pp. 17–19, 1/12/23.

*Primary Examiner*—Gerard R. Strecker
*Attorney*—William G. Miller, Jr. and Raymond F. MacKay

[57] ABSTRACT

A bridge circuit is calibrated with a variable resistor in the loop across the current detector which includes an unfaulted as well as the faulted conductor. A potentiometer resistor making up the other loop across the current detector is set in accordance with the known length of the faulted conductors prior to adjustment of the variable resistor. This calibration occurs with the current source connected between the potentiometer contact and another unfaulted conductor. The measurement is accomplished by adjusting the contact when the current source is connected between the potentiometer contact and the fault.

1 Claim, 1 Drawing Figure

PATENTED DEC 19 1972
3,706,927
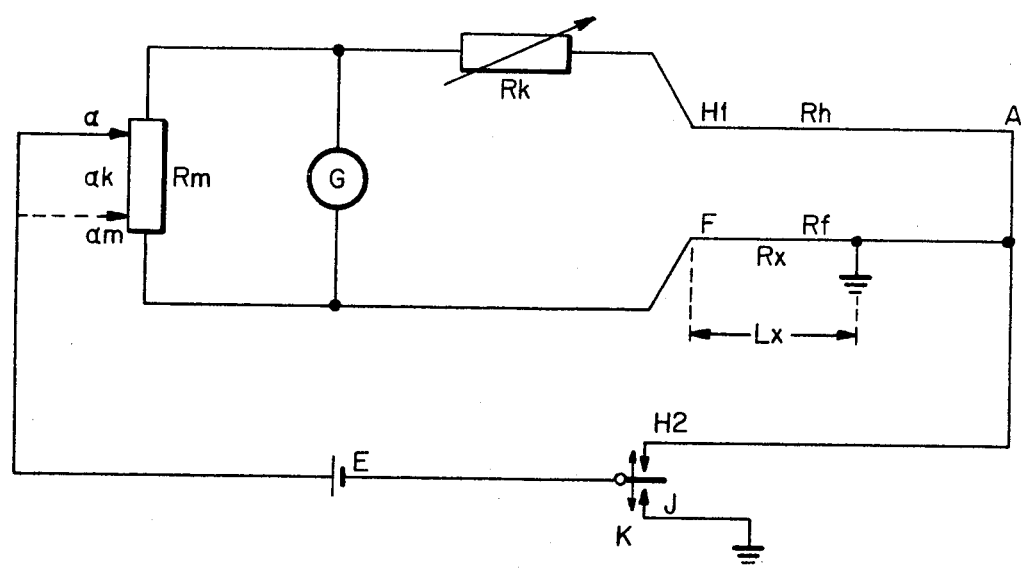

METHOD FOR MEASURING THE ABSOLUTE DISTANCE TO A LEAKAGE FAULT IN AN ELECTRICAL CONDUCTOR

BACKGROUND OF THE INVENTION

This invention relates to a method for measuring the absolute distance to a leakage fault in an electrical conductor of a cable and is particularly directed to the measurement of the distance to the fault when the length of the cable is known and when two faultless conductors can be utilized as pilot wires. The leakage faults with which this invention is concerned include not only leakage between the conductor and the cable sheath (ground) but also between the conductors of the cable.

In Swedish Pat. No. 204,930 as well as in U.S. Pat. No. 1,034,609 there has been described a method for measuring the absolute distance to a leakage fault in an electrical conductor where the diameter and the temperature of the conductor is known. In those patents, however, there is no provision made for measuring the distance to the fault when the length of the faulted conductor is the known factor.

SUMMARY OF THE INVENTION

This invention concerns a method for measuring with a bridge circuit the distance to a leakage fault in one of the conductors of a cable when it is connected to an unfaulted conductor at a remote point beyond the fault, the unfaulted wire acting as a transfer conductor or pilot wire. The bridge has an equipotential indicator which has a first loop across it. The first loop includes the faulted and an unfaulted conductor in series with a variable resistor. A second loop across the indicator includes a potentiometer resistor having an adjustable tap. The bridge also includes a current source which is selectively connectable at one time between the variable tap of the potentiometer resistor and an unfaulted conductor, which conductor is connected at the remote point with the faulted conductor, or at another time to the fault itself. The method for measuring the distance to the fault using this bridge circuit includes the adjustment of the tap of the potentiometer resistor to a point corresponding to the total length of the faulted conductor and adjusting the variable resistor to balance the bridge when the potentiometer tap is so adjusted. With the bridge calibrated by these steps, the measurement is then accomplished by adjusting the tap of the potentiometer resistor to balance the bridge when the current source is connected between the potentiometer resistor and the fault itself. That adjustment of the tap then provides a measurement of the distance to the fault.

BRIEF DESCRIPTION OF THE DRAWING

The FIGURE is a circuit diagram of the bridge showing its connection to the conductor being tested.

DESCRIPTION OF THE PREFERRED EMBODIMENT

The FIGURE shows the bridge circuit used in measuring the distance Lx to the leakage fault from the point of connection F. The particular fault shown in the FIGURE is one in which there is leakage to the cable sheath and hence a leakage to ground. An unfaulted conductor of the cable A–H1 is connected to the faulted conductor at the terminal point A and the bridge circuit is then connected to the two conductors at the connection points F and H1.

The bridge circuit itself includes a current detector G which may be a galvanometer, for example. Across the current detector there is connected a first loop which includes the variable resistor Rk serially connected with the unfaulted and the faulted conductors H1–A and A–F, respectively. A second loop across the current indicator is formed by potentiometer resistor Rm which has a variable tap $\alpha$.

The current supply to the bridge is provided by the battery E which is connected to the tap of the potentiometer resistor and to the switch K, which is shown as having two selectable positions. With the switch K connected by way of the upper contact to terminal H2, the current source E forms a complete circuit with the bridge elements through another unfaulted conductor H2–A.

With the switch K connected by way of the lower contact to terminal J, the current source E completes the circuit to the fault itself, namely through ground, as shown in the FIGURE.

In calibrating the bridge, the switch K is connected to the upper contact and the variable tap $\alpha$ of the potentiometer resistor Rm is positioned so as to correspond to the known length of the faulted conductor F–A. With the switch so positioned and the variable tap adjusted to a position $\alpha k$ set in accordance with the total length of the faulted conductor, the variable resistor Rk is adjusted to balance the bridge so that there is a zero indication on the current indicator G.

The switch K is then switched to the lower contact so that the current source of the bridge then connects the variable tap of the potentiometer resistor Rm to the fault itself. With the switch in that position, the setting of the variable tap $\alpha$ is adjusted until balance is obtained in the bridge, namely to the position $\alpha m$. With the adjustment of the variable tap for bridge balance, there can then be read off at the position $\alpha m$ from the calibration on the potentiometer resistor Rm the distance to the fault.

During the calibration adjustment the adjustable contact of the potentiometer resistor is set at a position $\alpha k$ corresponding to the total length or a multiple of the total length of the conductor so that when the bridge is balanced through adjustment of the resistor Rk, the following mathematical relationship between the various resistance values in the bridge will prevail:

$$(\alpha k Rm)/(Rm) = (Rf)/(Rf + Rh + Rk)$$

After the switch K is positioned to contact the lower contact for the purpose of making the distance measurement, the bridge is balanced by the adjustment of the potentiometer contact to a position $\alpha m$ to provide balance of the bridge. With that particular adjustment, the mathematical relationship of the various resistances in the bridge circuit will be as follows:

$$(\alpha m Rm)/(Rm) = (Rx)/(Rf + Rh + Rk)$$

When coordinating the above equations, we obtain:

$$(\alpha m \alpha k) = (Rx/Rf)$$

and as $Rx$ and $Rf$ are the magnitudes of the resistance between the connecting point F and the leakage fault and the total resistance of the faulted conductor respectively, then $\alpha m$ will, at balance, correspond directly to the distance to the leakage fault.

What is claimed is:

1. A method for measuring with a bridge circuit the distance to a leakage fault in one of the conductors of a cable when it is connected to an unfaulted conductor at a remote point beyond the fault and the bridge has an equipotential indicator, a first loop across said indicator which includes the faulted and an unfaulted conductor in series with a variable resistor, a second loop across said indicator including a potentiometer resistor having an adjustable tap, and a current source selectively connectable at one time between the variable tap of said potentiometer resistor and another unfaulted conductor, which conductor is connected at the remote point with the faulted conductor, or at another time to the fault itself, comprising the steps of adjusting the tap of the potentiometer resistor to a point corresponding to the total length of the faulted conductor;

adjusting the variable resistor to balance the bridge so that a zero indication is produced on said indicator with the current source connected to said other unfaulted conductor; and adjusting the tap of said potentiometer resistor to balance said bridge when said current source is connected to said fault so that the position of the tap corresponds to the distance to the fault.

* * * * *